000# United States Patent Office 3,339,478
Patented Sept. 5, 1967

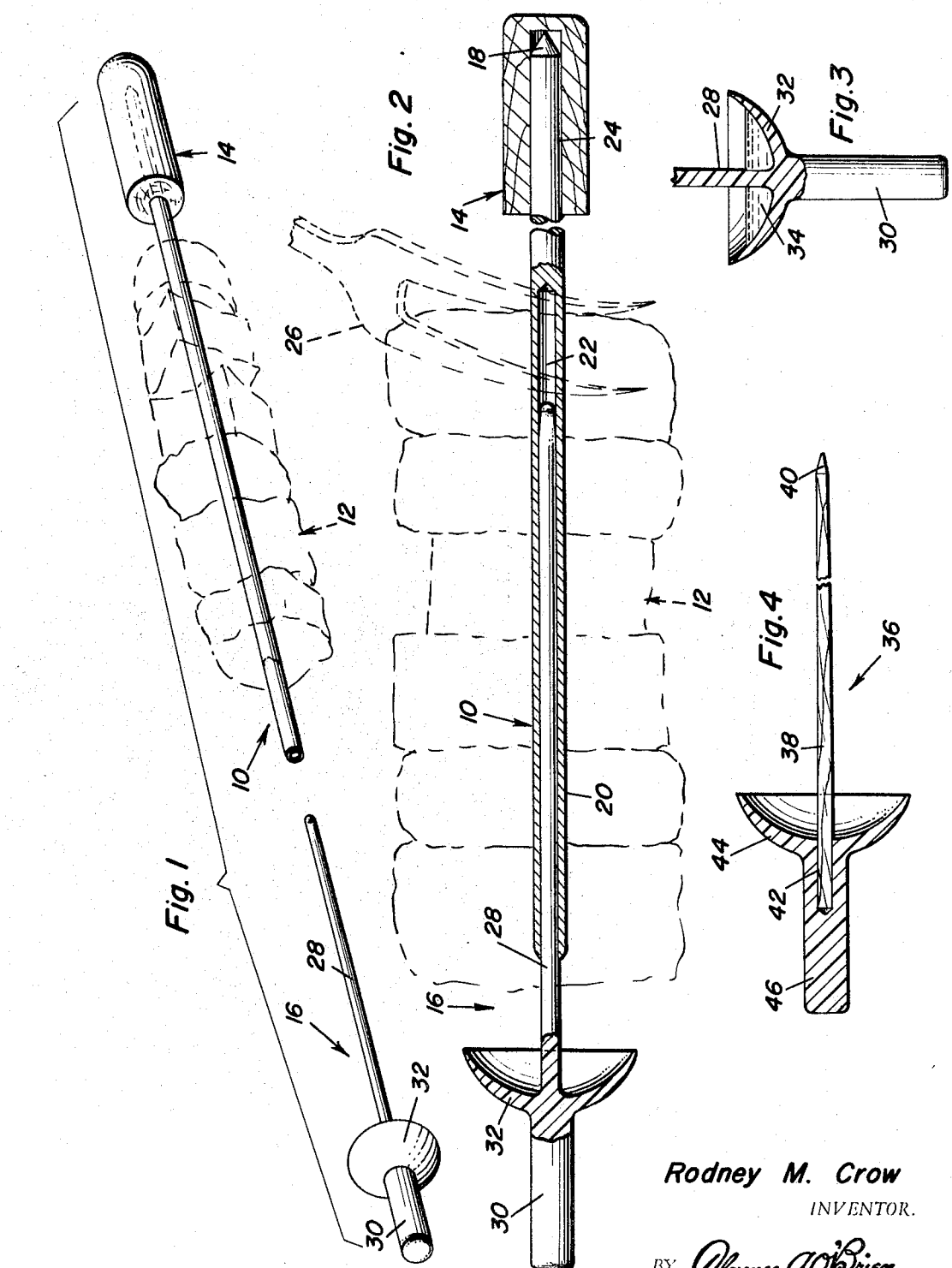

3,339,478
DISPOSABLE SHISH-KEBAB HOLDER
Rodney M. Crow, c/o Northwest Hospital & Clinic,
2100 Highway 183, Fort Worth, Tex. 76106
Filed Aug. 6, 1965, Ser. No. 477,793
9 Claims. (Cl. 99—355)

ABSTRACT OF THE DISCLOSURE

A food holding rod adapted to be inserted into one end of a tubular skewer so that food cooked on the skewer may be transferred to the rod. The food holding rod is provided with a grip portion and a drip cup and is made from disposable materials. The skewer is manipulated by a wooden handle received on either the pointed end or the tubular end of the skewer.

This invention relates to culinary implements or apparatus and more particularly to the cooking and handling of food utilizing a shish-kebab sweker.

A primary object of the present invention is to provide food cooking and handling implements of the aforementioned type whereby food cooked on a shish-kebab skewer may be dispensed to the public in a rapid and economical manner.

A further object of the present invention is to provide in combination with a shish-kebab skewer a disposable shish-kebab holder which will facilitate the handling of food and provide a pleasing and convenient method for dispensing cooked food to the public.

In accordance with the foregoing objects, bite size chunks of food are impaled on a shish-kebab skewer for cooking purposes after which the food is transferred to a disposable shish-kebab food holder. The shish-kebab cooking skewer in accordance with the present invention is therefore formed with a pointed end for impaling the chunks of food, and a tubular end portion adapted to slidably receive the holder to which the chunks of food are transferred. Wooden handles are provided so that they may receive either end of the cooking skewer in order to facilitate handling of the skewer for both impaling the food and transporting the food after being cooked. The holder on the other hand is a disposable item sold with the food to the public and includes a drip cup interconnected between a grip portion and an elongated shank portion to which the chunks of food are transferred.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the implements associated with the present invention;

FIGURE 2 is a side elevational view of the implements of the present invention with portions shown in section;

FIGURE 3 is an elevational view with parts shown in section of a portion of the shish-kebab holder in a vertical position; and FIGURE 4 is a side sectional view of a modified form of shish-kebab holder.

Referring now to the drawings in detail, it will be observed that the apparatus of the present invention includes a shish-kebab cooking skewer generally referred to by reference numeral 10 on which a plurality of food chunks are adapted to be impaled so that they may be cooked while carried on the skewer in a well known manner associated with the cooking skewer 10, is a heat insulating handle 14 adapted to receive either end of the cooking skewer 10. While the cooking skewer 10 is adapted to be continuously reused for cooking food thereon, the apparatus of the present invention also includes a disposable holder 16 which is to be dispensed with the food thereon to the public.

Referring now to FIGURE 2 in particular, it will be observed that the cooking skewer 10 includes a pointed end portion 18 which is solid and a tubular end portion 20 having an elongated bore 22 within which the holder 16 is slidingly received. The handle 14 is made of a non-conductive material such as wood and is formed with a bore 24 adapted to receive either end portion of the skewer 10, so that the skewer when heated may be held in the hand despite the fact that it is made of a heat conductive material such as metal. Thus, in order to impale the food on the skewer, the wooden handle 14 would be slipped over the tubular end portion 20 opposite the pointed end portion 18. Thereafter, the handle 14 may be slipped over the pointed end portion or handles placed on both end portions in order to transport the skewer with the chunks of food 12 impaled thereon. Once the chunks of food are cooked on the skewer, the wooden handle may be removed from the tubular end portion so that the skewer may slidably receive the holder 16. The chunks of food 12 may then be transferred to the holder 16 by utilizing a fork 26 for example, as shown by dotted line in FIGURE 2 in order to axially slide the chunks of food off the skewer onto the holder 16.

In one form of the invention, the holder 16 may be integrally formed from a single piece of non-conductive material such as a high impact, polystyrene plastic, as shown in FIGURES 2 and 3. The holder includes, therefore, an elongated shank 28 of a dimension to be slidably received within the bore 22 of the tubular end portion of the cooking skewer 10. Thus, the chunks of food 12 which may include meat, vegetables, cheeses and seafood, etc. may be displaced onto the shank 28 as the shank is progressively withdrawn from the tubular end of the skewer, in order to receive additional chunks of food. The holder is therefore grasped by means of a wider grip portion 30 to which the shank is connected by a spacing shield or drip cup 32 in axially spaced relation to the cooking skewer 10. The drip cup 32 is arranged to protectively shield the user's hand from the heated skewer and food as well as to collect drippings 34 from the food carried on the shank portion 28 when the holder is held in a vertical position. Thus, after a predetermined number of food chunks are transferred to the shank 28 of the holder, it may be completely withdrawn from the cooking skewer and handed to the consumer in a vertical position as shown in FIGURE 3.

A modified form of holder 36 is shown in FIGURE 4 which is similar in configuration and use to the holder 16 described in connection with FIGURES 1 through 3. The shank portion of the holder 36, however, is in the form of an elongated wooden dowel 38 having a pointed end portion 40 for guidingly inserting the holder into the tubular end portion of the cooking skewer. The dowel 38 is received within an axial bore 42 which extends through the bottom of the drip cup 44 into the grip portion 46 molded integrally with the drip cup of a suitable non-conductive material such as plastic. In the form of holder shown in FIGURE 4, it will be appreciated that while the dowel 38 may be disposable, the drip cup and grip portion could be reused.

From the foregoing description, the construction and utility of the implements or articles which form the present invention, will be apparent. It will therefore be appreciated that the apparatus of the present invention will facilitate the cooking and handling of food as well as to provide a pleasing, rapid and economical method for dispensing the food to the public.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, an elongated heat-conductive cooking skewer having a tubular end portion and a pointed end portion, a skewer carrying handle adapted to slidably receive either of said end portions of the cooking skewer and mounted on one end thereof, and a holder including an elongated shank received within said tubular portion of the cooking skewer and a drip cup connected to the shank in spaced relation to the cooking skewer having a grip portion projecting therefrom on one side opposite the shank.

2. The combination of claim 1 wherein said holder is integrally formed from a single non-heat-conductive material.

3. The combination of claim 1 wherein said drip cup and said grip portion of the holder are integrally formed from a non-heat-conductive material.

4. The combination of claim 3 wherein said shank is received within an axial bore extending through the drip cup into the grip portion.

5. Apparatus for cooking and handling food comprising an elongated cooking skewer having a pointed end for impaling said food and a tubular end portion, removable handle means mounted on said skewer and adapted to receive said tubular end portion or said pointed end of the cooking skewer to respectively impale the food and transport the impaled food, and holder means received within said tubular end portion of the cooking skewer for transfer of the impaled food thereto, said holder means including a shank portion slidably extending into the tubular end portion of the skewer, a grip portion and means interconnected between the grip portion and the shank portion for spacing the grip portion from the skewer.

6. Apparatus for cooking and handling food comprising an elongated cooking skewer having a solid pointed end for impaling said food and a tubular end portion, removable handle means mounted on said skewer and adapted to receive said tubular end portion or said pointed end of the cooking skewer to respectively impale the food and transport the impaled food, disposable holder means received within said tubular end portion of the cooking skewer for transfer of the impaled food thereto including a shank portion slidably extending into the tubular end portion of the skewer and a grip portion connected to the shank portion in spaced relation to the skewer, and a drip cup interconnected between the grip and shank portions of the disposable holder means.

7. The combination of claim 6 wherein said shank portion comprises a wooden dowel received within a bore extending through the drip cup into the grip portion.

8. Apparatus for dispensing cooked food comprising an elongated cooking skewer having opposite end portions, one of said end portions being pointed for impaling food, removable handle means mounted on said skewer and adapted to receive either of said end portions to respectively impale the food and transport the impaled food, holder means mounted in telescoping relation by the other of said end portions opposite said one of the end portions of the skewer, said holder means including a shank portion receiving the impaled food transferred from the skewer, a grip portion and shield means interconnected between the shank and grip portions to space the grip portion from the skewer.

9. The combination of claim 8 wherein said shield means comprises a drip cup for collecting drippings from the food transferred to the shank portion of the holder means.

References Cited

UNITED STATES PATENTS

| | | | |
|---|---|---|---|
| 239,810 | 4/1881 | Levi | 132—72 X |
| 625,692 | 5/1899 | Morgan | 129—8 |
| 775,159 | 11/1904 | Womble | 129—8 |
| 1,454,069 | 5/1923 | Obrikat | 129—8 |
| 2,910,930 | 11/1959 | Hankoff | 99—421 |
| 2,943,743 | 7/1960 | Thorson | 129—8 X |

WALTER A. SCHEEL, *Primary Examiner.*

J. NEARY, *Assistant Examiner.*